Patented Aug. 28, 1923.

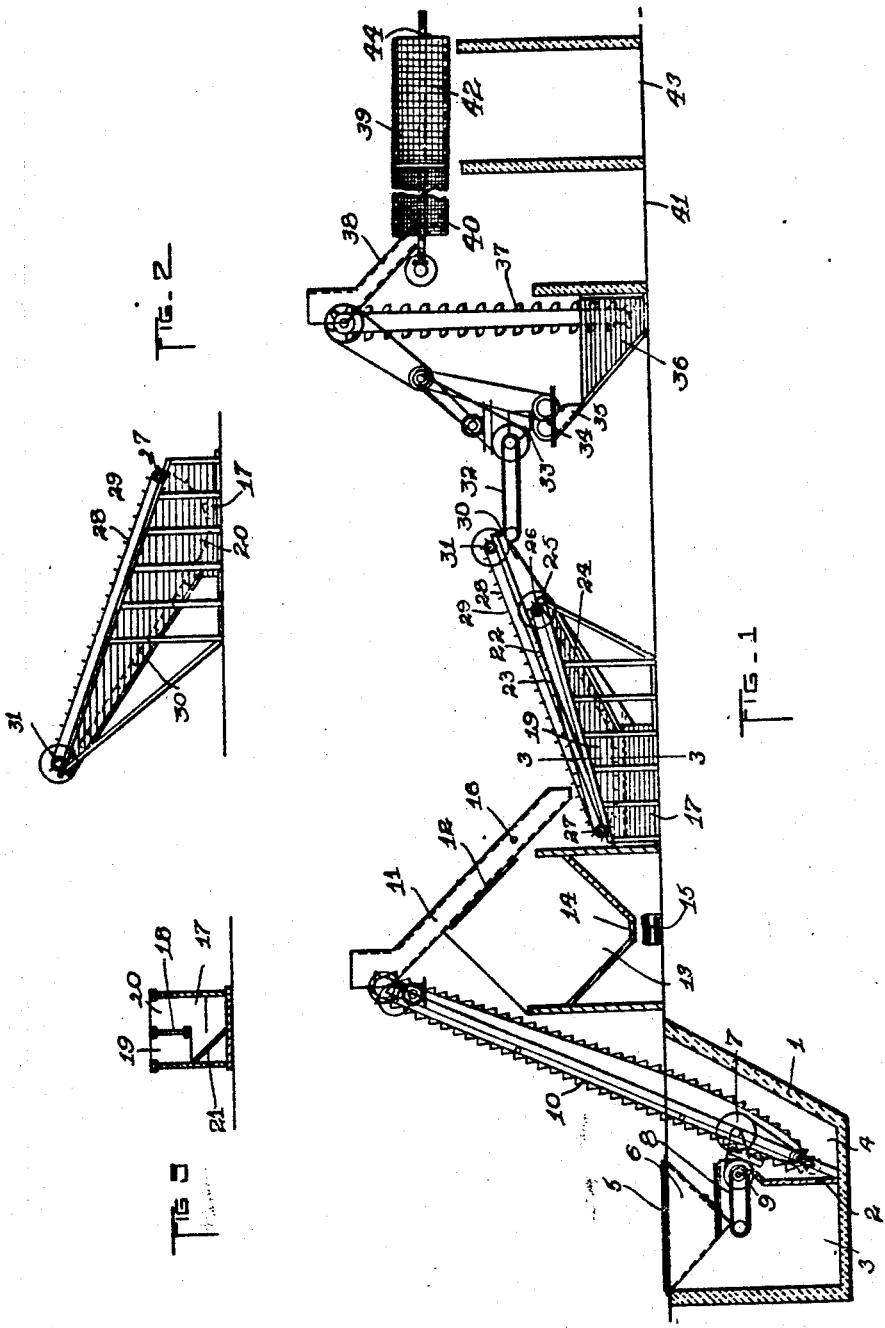

1,466,083

UNITED STATES PATENT OFFICE.

SIGURD BO, OF LOCKPORT, NEW YORK, ASSIGNOR TO CINDER PRODUCTS CORPORATION, OF LOCKPORT, NEW YORK, A CORPORATION OF NEW YORK.

METHOD OF MAKING PLASTIC BODIES FROM COAL ASHES AND A PLASTIC BODY MADE FROM SUCH METHOD.

Application filed May 11, 1921. Serial No. 468,698.

*To all whom it may concern:*

Be it known that I, SIGURD BO, a subject of the Kingdom of Norway, and resident of Lockport, in the county of Niagara and State of New York, have invented certain new and useful Improvements in Methods of Making Plastic Bodies from Coal Ashes and a Plastic Body Made from Such Method, of which the following is a specification.

The present invention relates to a method of making plastic bodies from coal ashes, the refuse of stoves, furnaces or the like, and to a plastic body made from such method, this application being a continuation of an application filed by me on the 21st day of July, 1920, Serial No. 397,973. An object of this invention is to produce a plastic body containing the desirable constituents of coal ashes, substantially free from the undesirable constituents of such ashes.

This and other objects will appear in the following description and will be more particularly pointed out in the appended claims, reference being had to the drawings, wherein is shown a machine for carrying out the present invention;

Fig. 1 being a diagrammatic view of such machine;

Fig. 2 being a view of another side of one of the devices used in this machine; and Fig. 3 being a section on the line 3—3, Fig. 1.

The illustrated machine comprises a pit 1 having a partition 2 dividing the pit into a compartment 3 and a compartment 4. Over the compartment 3 is arranged a grating 5 on which the ashes as they come from the furnace or like appliance are deposited. This grating serves to separate the large lumps from the smaller matter, the smaller matter falling into the hopper 6 and the large lumps being broken up so that the parts thereof may also fall into the hopper to be discharged onto an endless conveyor 8, one pulley 9 of which is in the form of a magnet which will draw from the ashes any metallic parts and cause the same to be deposited in the trough 3. A blower 7 may be arranged to blow the fine ash dust on the belt into the compartment 3 of the pit. The other material is discharged into the compartment 4 from which it is removed by a bucket elevator 10 which carries the material upwardly to a chute 11 which has a screen 12 in its bottom through which material larger than that separated by the blower 7, passes into the receptacle or hopper 13 from which it may be discharged through an opening 14 onto a belt conveyor 15 extending transversely of the hopper 13.

After passing over the screen of the screening chute 12, the material is subjected to a spray of water through a spray pipe 16 extending transversely of the chute. The purpose of spraying the material at this point is to saturate the same so that when it enters a bath later on, the material will not absorb so much of the bath and furthermore the time required to be treated by the bath will be reduced.

The bath is arranged to receive the material from the screened chute 11. The bath is, in this instance, contained in a receptacle 17 having a partition 18 dividing it into two parallel chambers 19 and 20 communicating below the partition 18. An inclined member 21 is arranged below the chamber 19 so that material discharged from said chamber will fall to the bottom of the chamber 20. The chute 11 discharges into the chamber 19 and certain of the material floats on top of the liquid in the chamber 19 while other of such material falls to the inclined member 21 and is directed to the bottom of the chamber 20. The material floating in the chamber 19 is coke and forms a valuable bi-product of the process. This is removed from the chamber 19 by an endless conveyor 22 having blades 23 which travel over the surface of the liquid in the compartment 19, this conveyor leading over the inclined way 24 so that the coke is removed from the surface of the liquid up such way 24 and discharged at 25 from the tank. The coke-removing conveyor is preferably mounted on shafts 26 and 27, the shaft 27 also serving as a support for a conveyor 28 which operates in the compartment 20 and removes the heavier matters from the bath. This conveyor 28 has blades 29 and travels up an inclined way 30 which is exetended beyond the way 24, the upper end of the conveyor being passed about a pulley on the shaft 31.

The bath in the tank or receptacle 17 may comprise a mixture of water, lime and herring brine. This bath serves for a number of purposes. It removes the soluble matters from the clinkers. It also acts to water proof the material due to the fact that the fish oil in the herring brine forms a coating and the lime fills the pores. It washes and separates the coke, this being due to the specific gravity of the bath, the fish oil in the bath assisting in this floatation by collecting on the surface of the coke. The oil may be in any other form, but herring brine serves as a cheap source. The separation of the coke from the other material of the ashes may be assisted by the use of steam issuing from the pipes into the bath, the agitation produced from the steam also increasing the temperature of the bath and the speed at which the chemical action takes place. Due to the fact that the ashes are moistened before entering the bath, they do not absorb so much of the liquid of the bath. The fine dust and smaller particles of the ashes having been eliminated, that material introduced into the bath consists mainly of coke and clinkers. The floating coke is scraped off the surface of the liquid in compartment 19 of tank 17 and the clinkers are removed from the bottom of the compartment 20 due to the fact that they are heavier and fall down the inclined bottom piece 21. The inclined walls 24 and 30 permit the liquid from the coke and the clinkers to drain back into the tank 17, the inclined wall 30 being longer than the wall 24 so that the discharge points of the two walls are at different positions, and furthermore, the clinkers which are the more moist are given a longer time to drain before being discharged.

From the wall 30 the clinkers are deposited on a belt 32 which serves as a place where large pieces of coke which are not removed by the bath may be picked off by hand. This belt also discharges the material thereon into a hopper 33 which directs such material to the two crushing rolls 34 where it it broken up.

The clinkers as they come from the crusher are in a moist condition, and while in this condition may be mixed with fine material either from the pit compartment 3 or the hopper 13, or both, the moisture still existing in the crushed clinkers, serving to reduce the water absorptive properties of the fine ashes. There will be a slight amount of coke in these fine ashes, but it will not be of an amount sufficient to effect materially the fireproofing qualities of the plastic body nor cause the body to be affected by changes in temperature. The mixture of fine ashes and clinkers should be dried and may then be used with cement or other binder to produce a plastic body. Dry lime may also be used as a binder with the cement and this serves also to reduce the water absorptive properties of the fine ashes and clinkers. Alum may also be used for waterproofing the ashes and clinkers, this being preferably employed in a one per cent solution.

The clinkers as they come from the crusher may be subjected to another bath for water- and fire-proofing them. This bath may be contained in a receptacle 36 and comprise a solution of water glass which will combine with the lime coating from the bath 17, thus forming an insoluble calcium coating on the clinkers.

Other materials may be used in the second bath in place of the water glass, as for instance a soap solution or an alum solution. From the bath 36, the material is moved by an endless conveyor 37 which carries the same to the chute 33. The chute 38 discharges into a separating drum 39 which has small openings 40 discharging into a bin 41, larger openings 42 discharging into a bin 43, the material which does not pass through the series of openings 40 and 42 being discharged out of the end of the drum at a point 44. These different sizes may be later mixed in any desirable proportions.

Assuming that the ashes have been first subjected to an alkaline bath containing fish oil or herring brine and later after crushing, subjected to a solution of water glass, the following is an example of the use of the purified and treated clinkers in the making of a plastic body:

5 parts purified and treated clinkers,
$\frac{9}{10}$ part cement,
$\frac{1}{10}$ to $\frac{1}{5}$ part of lime,
1% solution of alum and water.

From the above composition there will be obtained a substantially water and fire proof stone, the clinkers being coated with insoluble compounds of silica.

Some other ingredients which may be used in the tank 36 in place of the water glass are as follows:

1 to 5 per cent of alum may be used and in this case the purified clinkers are mixed with cement, dry lime, and substantially 2 per cent of water glass in solution. This will cause the clinkers in the plastic body to be coated with insoluble compounds of lime and alumina. 1 to 5 per cent of soap may be used in the tank 36 and in this case in making a plastic body, dry lime and 1 to 2 per cent solution of alum may be used. This will form on the clinkers in the plastic body, insoluble lime soaps and compounds of alumina. The last results may also be secured by placing 1 to 5 per cent solution of alum in the bath 36 and mixing in the plastic body, dry lime and a soap solution of 1 to 2 per cent.

From the foregoing it will be seen that there has been provided a plastic body made from the desirable ingredients of coal ashes with the coke and soluble salts substantially eliminated, the water absorptive properties being reduced, the clinkers having a water proof coating formed thereon. It will thus be seen that the lime performs two functions, viz., increases the specific gravity of the bath to assist in the separation of the coke, and assists to reduce the water absorptive properties of the clinkers. Not only is the process of treating the ashes new and novel, but the plastic body obtained from such process is new and novel.

What I claim as my invention and desire to secure by Letters Patent is:

1. A plastic body comprising a binder and crushed coal ashes substantially free from coke and soluble salts.

2. A plastic body comprising crushed clinkers of coal ashes and fine coal ashes and being substantially free from coke and soluble salts.

3. A plastic body comprising cement and crushed coal ashes with the coke substantially removed, and the water absorptive properties reduced.

4. The process of making plastic bodies which consists in separating the fine particles from coal ashes, subjecting the residue to a bath to separate the coke and reduce the water absorptive properties of the remainder, crushing the latter while moist, combining the crushed matter with the fine particles to absorb the excess moisture and to reduce the water absorptive properties of said fine particles, and combining the mixture with the binder to form a plastic body.

5. The process of making plastic bodies which consists in subjecting the coal ashes to a bath to substantially remove the coke by floatation, crushing the larger particles falling to the bottom of the bath, and combining such crushed larger particles with a binder.

6. The process of making plastic bodies which consists in reducing the water absorptive properties of coal ashes and substantially removing the coke both by a liquid bath, crushing the larger particles falling to the bottom of the bath, and combining such larger particles with a binder.

7. The process of making plastic bodies which consists in removing the coke from coal ashes by floatation in a bath, crushing the heavy matter falling to the bottom of the bath, while such matter is moist from the bath, at least partially drying the crushed matter, and combining with the binder.

8. The process of making plastic bodies which consists in subjecting coal ashes to a bath of a specific gravity greater than water to float the coke, removing the heavier matter from the bath, crushing the same and combining with a binder.

9. The process of making plastic bodies which consists in separating the fine particles from coal ashes, subjecting the residue to a bath of greater specific gravity than water to float the coke, removing the heavier matter, crushing the same, and combining it with a binder.

10. The process of making plastic bodies which consists in separating the fine particles from coal ashes, subjecting the residue to a bath of greater specific gravity than water to float the coke, removing the heavier matter, crushing the same, mixing the crushed matter with the fine particles, and combining it with a binder.

11. The process of making plastic bodies which consists in subjecting coal ashes to a bath containing lime and herring brine to float the coke, crushing the heavier matters and combining the crushed matter with a binder.

12. The process of making plastic bodies which consists in substantially removing the coke, crushing the large particles, subjecting the crushed matter to a bath which will form an insoluble coating on such crushed matter, and combining with a binder.

13. The process of making plastic bodies which consists in subjecting coal ashes to a chemical bath to remove the coke by floatation and to saturate the larger particles, crushing the larger particles, subjecting the crushed matter to a bath which will combine with the chemical of the first mentioned bath to form an insoluble coating on such crushed matter, and combining with a binder.

14. The process of making plastic bodies which consists in moistening coal ashes, subjecting the latter to a bath to separate the coke by floatation, crushing the heavier matter and mixing the latter with a binder.

15. The process of making plastic bodies which consists of subjecting coal ashes to a bath to separate the coke by floatation, agitating the bath by steam to assist floatation, crushing the heavier matter, and mixing with a binder.

16. The process of making plastic bodies which consists in separating coke from coal ashes, crushing the remainder and combining the crushed matter with the binder.

17. The process of making plastic bodies which consists in first separating the fine particles from coal ashes, thereafter separating the coke from the larger particles, crushing the remainder, and combining the crushed matter with the fine particles, and a binder.

SIGURD BO.